US011755889B2

(12) United States Patent
Cao (10) Patent No.: US 11,755,889 B2
(45) Date of Patent: Sep. 12, 2023

(54) METHOD, SYSTEM AND APPARATUS FOR PATTERN RECOGNITION

(71) Applicant: Nokia Technologies Oy, Espoo (FI)

(72) Inventor: Jiale Cao, Tianjin (CN)

(73) Assignee: NOKIA TECHNOLOGIES OY, Espoo, ND (US)

( * ) Notice: Subject to any disclaimer, the term of this patent is extended or adjusted under 35 U.S.C. 154(b) by 594 days.

(21) Appl. No.: 16/652,632

(22) PCT Filed: Oct. 10, 2017

(86) PCT No.: PCT/CN2017/105544
§ 371 (c)(1),
(2) Date: Mar. 31, 2020

(87) PCT Pub. No.: WO2019/071433
PCT Pub. Date: Apr. 18, 2019

(65) Prior Publication Data
US 2020/0242451 A1    Jul. 30, 2020

(51) Int. Cl.
*G06V 10/82* (2022.01)
*G06V 10/764* (2022.01)
(Continued)

(52) U.S. Cl.
CPC ............ *G06N 3/048* (2023.01); *G06N 3/084* (2013.01)

(58) Field of Classification Search
CPC ..... G06N 3/0481; G06N 3/084; G06N 3/0454
(Continued)

(56) References Cited

U.S. PATENT DOCUMENTS 9,418,319 B2    8/2016  Shen et al.
10,713,794 B1*  7/2020  He ......................... G06N 3/084
(Continued)

FOREIGN PATENT DOCUMENTS

CN    105224942 A    1/2016
CN    105975931 A    9/2016
(Continued)

OTHER PUBLICATIONS

Huang et al. (DenseBox: Unifying Landmark Localization with End to End Object Detection, published Sep. 19, 2015, pp. 1-13) (Year: 2015).*
(Continued)

*Primary Examiner* — Stephen S Hong
*Assistant Examiner* — Ahamed I Nazar
(74) *Attorney, Agent, or Firm* — Lippes Mathias LLP (57) ABSTRACT

A method for pattern recognition may be provided, comprising: receiving data; processing the data with a convolutional neural network in order to recognize a pattern in the data, wherein the convolutional neural network comprises at least: a first branch comprising a sequence of first convolutional blocks, a pooling layer being disposed between any two adjacent first convolutional blocks, each first convolutional blocks comprising at least one convolutional layer, and a second branch comprising a sequence of second convolutional blocks, each second convolutional blocks comprising at least one convolutional layer, and wherein processing the data with a convolutional neural network in order to recognize a pattern in the data comprises: a preceding second convolutional block receiving a first feature map formed by combining of a feature map outputted by a preceding first convolutional block and a feature map outputted by a subsequent first convolutional block, processing the first feature map, and outputting a second feature map, (Continued)

and a subsequent second convolutional block receiving a third feature map formed by combining the second feature map and a feature map outputted by a further subsequent first convolutional block, processing the third feature map, and outputting a fourth feature map. A corresponding apparatus and system for pattern recognition, as well as a computer readable medium, are also provided.

20 Claims, 5 Drawing Sheets

(51) Int. Cl.
  *G06V 10/25* (2022.01)
  *G06V 20/40* (2022.01)
  *G06N 3/048* (2023.01)
  *G06N 3/084* (2023.01)
(58) Field of Classification Search
  USPC .... 706/15, 21; 382/103, 190, 279, 165, 156, 382/159
  See application file for complete search history.

(56) References Cited

U.S. PATENT DOCUMENTS

| | | | | |
|---|---|---|---|---|
| 10,853,698 | B2* | 12/2020 | Courtney | G06F 18/24143 |
| 2015/0347820 | A1* | 12/2015 | Yin | G06N 3/08 |
| | | | | 382/118 |
| 2016/0104056 | A1* | 4/2016 | He | G06N 3/04 |
| | | | | 382/158 |
| 2016/0275341 | A1* | 9/2016 | Li | G06F 18/24137 |
| 2017/0147905 | A1* | 5/2017 | Huang | G06V 40/165 |
| 2019/0073553 | A1* | 3/2019 | Yao | G06F 18/214 |
| 2019/0251383 | A1* | 8/2019 | Senay | G06V 10/764 |

FOREIGN PATENT DOCUMENTS

| | | |
|---|---|---|
| CN | 106485259 A | 3/2017 |
| CN | 106934456 A | 7/2017 |

OTHER PUBLICATIONS

Farrajota et al. (Using Multi-Stage Features in Fast R-CNN for Pedestrian Detection, published Dec. 3, 2016, pp. 1-8) (Year: 2016).*

Extended European Search Report received for corresponding European Patent Application No. 17928619.0, dated Mar. 21, 2022, 8 pages.

Abdulnabi et al., "Beyond Forward Shortcuts: Fully Convolutional Master-Slave Networks (MSNets) with Backward Skip Connections for Semantic Segmentation", arXiv, Jul. 18, 2017, pp. 1-9.

Cao et al., "Realtime Multi-person 2D Pose Estimation Using Part Affinity Fields", IEEE Conference on Computer Vision and Pattern Recognition (CVPR), 2017, pp. 1302-1310.

Ren et al., "Faster R-CNN: Towards Real-Time Object Detection with Region Proposal Networks", IEEE Transactions on Pattern Analysis and Machine Intelligence, vol. 36, No. 6, Jun. 1, 2017, pp. 1137-1149.

Cai et al., "A Unified Multi-scale Deep Convolutional Neural Network for Fast Object Detection", arXiv, Jun. 25, 2016, pp. 1-16.

Lin et al., "Feature Pyramid Networks for Object Detection", IEEE Conference on Computer Vision and Pattern Recognition (CVPR), Jul. 21-26, 2017, pp. 936-944.

Kong et al., "RON: Reverse Connection with Objectness Prior Networks for Object Detection", IEEE Conference on Computer Vision and Pattern Recognition (CVPR), Jul. 21-26, 2017, pp. 5244-5252.

Yu et al., "Dilated Residual Networks", IEEE Conference on Computer Vision and Pattern Recognition (CVPR), Jul. 21-26, 2017, pp. 636-644.

Simonyan et al., "Very Deep Convolutional Networks for Large-Scale Image Recognition[J]", arXiv, Sep. 4, 2014, pp. 1-10.

Fu et al., "DSSD : Deconvolutional Single Shot Detector", arXiv, Jan. 23, 2017, 11 pages.

Dai et al., "R-FCN: Object Detection viaRegion-based Fully Convolutional Networks", 30th Conference on Neural Information Processing Systems, 2016, pp. 1-9.

"Welcome to the KITTI Vision Benchmark Suite!", KITTI Vision Benchmark Suite, Retrieved on Mar. 24, 2020, Webpage available at: http://www.cvlibs.net/datasets/kitti/.

Bai et al., "Multi-branch Fully Convolutional Network for Face Detection", arXiv, Jul. 20, 2017, pp. 4321-4329.

Takeki et al., "Combining Deep Features for Object Detection at Various Scales: Finding Small Birds in Landscape Images", IPSJ Transactions on Computer Vision and Applications, vol. 8, 2016, pp. 1-7.

Liang et al., "Recurrent Convolutional Neural Network for Object Recognition", IEEE Conference on Computer Vision and Pattern Recognition (CVPR), Jun. 7-12, 2015, pp. 3367-3375.

Zhang et al., "Improving Object Detection with Deep Convolutional Networks via Bayesian Optimization and Structured Prediction", IEEE Conference on Computer Vision and Pattern Recognition (CVPR), Jun. 7-12, 2015, 10 pages.

Li et al., "Perceptual Generative Adversarial Networks for Small Object Detection", arXiv, Jun. 20, 2017, 9 pages.

Girshick, "Fast R-CNN", IEEE International Conference on Computer Vision (ICCV), Dec. 7-13, 2015, pp. 1440-1448.

International Search Report and Written Opinion received for corresponding Patent Cooperation Treaty Application No. PCT/CN2017/105544, dated Jun. 27, 2018, 9 pages.

* cited by examiner

METHOD, SYSTEM AND APPARATUS FOR PATTERN RECOGNITION

RELATED APPLICATION

This application claims priority to PCT Application No. PCT/CN2017/105544, filed on Oct. 10, 2017, which is incorporated herein by reference in its entirety.

TECHNICAL FIELD

Embodiments of the present disclosure relate generally to the field of pattern recognition, more particularly, to a method, system and apparatus for pattern recognition.

BACKGROUND

Object detection, as a specific form of pattern recognition, is a very classic computer vision task, and is increasingly applied in a wider range of fields, such as assistant driving and video surveillance. Recently, CNN (Convolutional Neural Network) based methods have achieved great success in object detection. Usually, it is based on two stages: proposal generation and proposal classification. Faster R-CNN (see S. Ren, K. He, R. Girshick, and *J. Sun, Faster R-CNN: Towards Real-Time Object Detection with Region Proposal Networks, IEEE Trans. Pattern Analysis and Machine Intelligence*, vol. 39, no. 6, pp. 1137-1149, 2017) is one of the most famous methods for object detection. It shares the same network for proposal generation and proposal classification. Thus, it can improve detection accuracy without increasing computation cost.

In spite of the success, object detection based on Faster R-CNN still has some problems. Faster R-CNN predicts the candidate proposals based on the last convolutional layer and then classifies the candidate proposals by pooling the features of the last convolutional layer. Although the last convolutional layer has a large receptive field and high-level semantic information, the spatial resolution of the feature map of the last convolutional layer is very small. It results that the spatial structure information of the original image is lost a lot. Thus, the performance of small-scale object detection is worse.

BRIEF SUMMARY

A method, apparatus, and system for pattern recognition, as well as a computer readable medium are therefore provided.

In one example embodiment, a method for pattern recognition is described. The method comprises: receiving data; processing the data with a convolutional neural network in order to recognize a pattern in the data, wherein the convolutional neural network comprises at least: a first branch comprising a sequence of first convolutional blocks, a pooling layer being disposed between any two adjacent first convolutional blocks, each first convolutional block comprising at least one convolutional layer, and a second branch comprising a sequence of second convolutional blocks, each second convolutional block comprising at least one convolutional layer, and wherein processing the data with a convolutional neural network in order to recognize a pattern in the data comprises: a preceding second convolutional block receiving a first feature map formed by combining of a feature map outputted by a preceding first convolutional block and a feature map outputted by a subsequent first convolutional block, processing the first feature map, and outputting a second feature map, and a subsequent second convolutional block receiving a third feature map formed by combining the second feature map and a feature map outputted by a further subsequent first convolutional block, processing the third feature map, and outputting a fourth feature map.

In another example embodiment, an apparatus for pattern recognition is described. The apparatus comprises: at least one processor, at least one memory including computer program code; the at least one memory and the computer program code configured to, with the at least one processor, cause the apparatus to: receive data; process the data with a convolutional neural network in order to recognize a pattern in the data, wherein the convolutional neural network comprises at least: a first branch comprising a sequence of first convolutional blocks, a pooling layer being disposed between any two adjacent first convolutional blocks, each first convolutional blocks comprising at least one convolutional layer, and a second branch comprising a sequence of second convolutional blocks, each second convolutional block comprising at least one convolutional layer, and wherein processing the data with a convolutional neural network in order to recognize a pattern in the data comprises: a preceding second convolutional block receiving a first feature map formed by combining of a feature map outputted by a preceding first convolutional block and a feature map outputted by a subsequent first convolutional block, processing the first feature map, and outputting a second feature map, and a subsequent second convolutional block receiving a third feature map formed by combining the second feature map and a feature map outputted by a further subsequent first convolutional block, processing the third feature map, and outputting a fourth feature map.

In another example embodiment, a system for pattern recognition, comprising: a receiving module configured to receive data; and a convolutional neural network configured to process the data in order to recognize a pattern in the data, wherein the convolutional neural network comprises at least: a first branch comprising a sequence of first convolutional blocks, a pooling layer being disposed between any two adjacent first convolutional blocks, each first convolutional block comprising at least one convolutional layer, and a second branch comprising a sequence of second convolutional blocks, each second convolutional block comprising at least one convolutional layer, wherein processing the data in order to recognize a pattern in the data comprises: a preceding second convolutional block receiving a first feature map formed by combining of a feature map outputted by a preceding first convolutional block and a feature map outputted by a subsequent first convolutional block, processing the first feature map, and outputting a second feature map, and wherein a subsequent second convolutional block receiving a third feature map formed by combining the second feature map and a feature map outputted by a further subsequent first convolutional block, processing the third feature map, and outputting a fourth feature map.

In another example embodiment, a computer readable medium encoded with instructions that, when executed by a computer, cause performance of a method according to any embodiment of the present disclosure.

BRIEF DESCRIPTION OF THE DRAWING(S)

Having thus described the disclosure in general terms, reference will now be made to the accompanying drawings, which are not necessarily drawn to scale, and wherein:

DETAILED DESCRIPTION

To improve the performance of object detection, the present disclosure proposes a CNN-based network that gradually combines multiple layers of a CNN into a high-level semantic and high-resolution layer. Specifically, the network is split into two branches. One branch is the same as an original CNN structure. Another branch is to gradually combine the multiple layers of the original CNN structure without reducing the spatial resolution. Finally, the CNN-based network that gradually combines the multiple layers into a high-level semantic and high-resolution layer is used for object detection.

Figure 1:
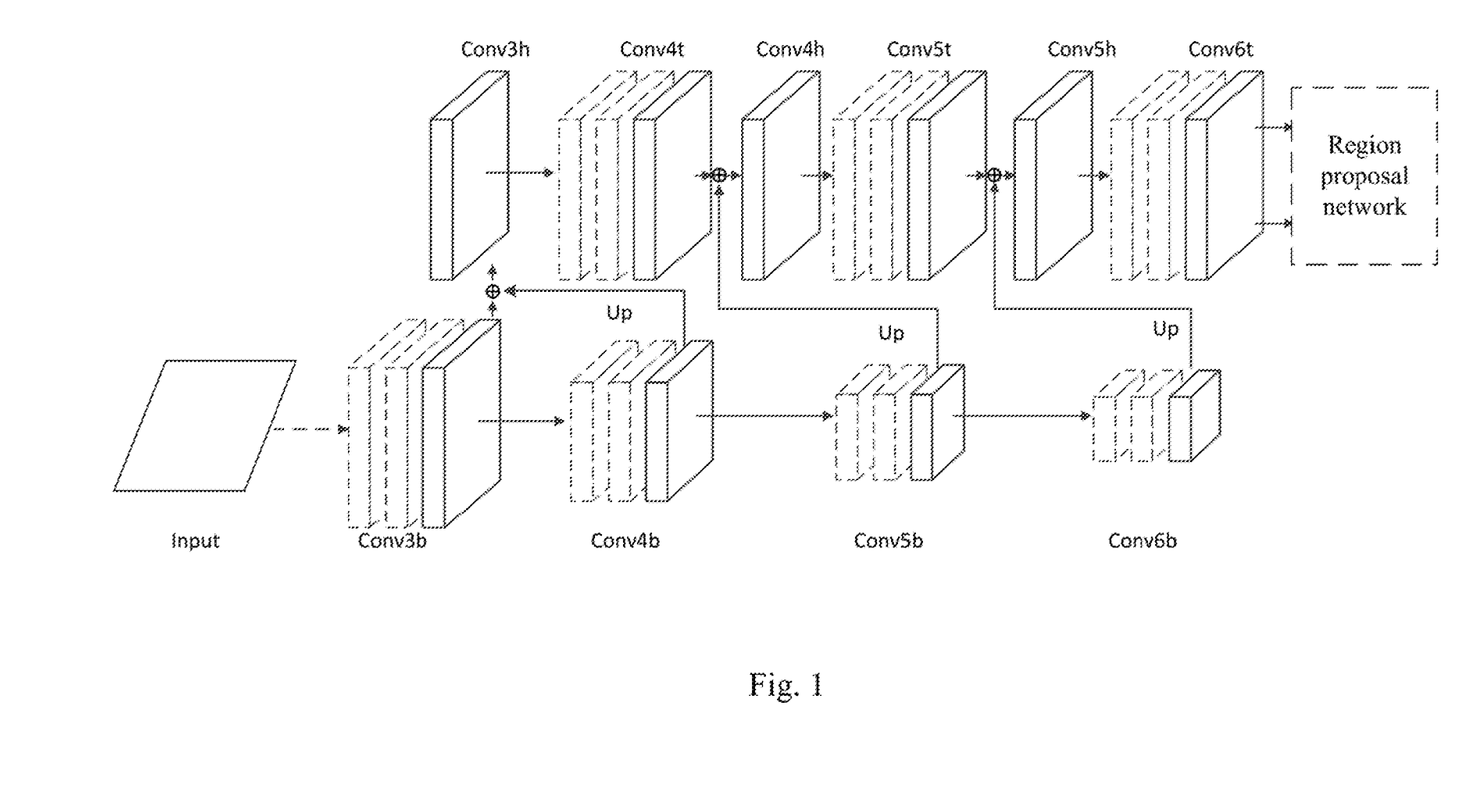
FIG. 1 shows a schematic architecture of a CNN-based network gradually combining multiple layers of a CNN according to some embodiments of the present disclosure.

Referring to FIG. 1, there is shown a schematic architecture of a CNN-based network gradually combining multiple layers of a CNN according to some embodiments of the present disclosure. Given an input image, the CNN-based network with two branches may be used to detect an object in the input image.

As shown in FIG. 1, the CNN-based network according to some embodiments comprises two branches. The below branch may be the same as a standard CNN architecture. It may consist of a plurality of convolutional blocks in a sequence. In the example shown, the below branch comprises four convolutional blocks, denoted as Conv3b, Conv4b, Conv5b, and Conv6b; it may optionally comprise two additional convolutional blocks, Conv1b and Conv2b, before the convolutional block Conv3b, which are not shown in the figure. There may be a pooling layer (not shown in the figure) between each pair of adjacent convolutional blocks, such that compared to the spatial resolution of a preceding convolutional block, the spatial resolution of a subsequent convolutional block is reduced, e.g., by a factor of 2. Each convolutional block may comprises one or more convolutional layers, and each convolutional layer may comprises a convolutional layer proper composed of one or more filters, and an activation function layer such as a Rectified Linear Unit (ReLU) layer. The convolutional layer may also comprise other layers, such as a batch normalization layer disposed between the convolutional layer proper and the activation function layer.

Each convolutional layer takes as input data an image or a feature map outputted by the preceding convolutional layer, performs a convolution operation with each of its filters on the input data, and outputted a feature map containing semantic information extracted from the input data.

Since there is a pooling layer disposed between each pair of adjacent convolutional blocks, the feature map outputted by the preceding convolutional block will have high-resolution spatial information but low-level semantic information, while the feature map outputted by the subsequent convolutional block will have high-level semantic information but low-resolution spatial information.

In some exemplary embodiments, the top branch may be a high-resolution branch. It may consist of a plurality of convolutional blocks in a sequence. In the example shown, it consists of three convolutional blocks, Conv4t, Conv5t, and Conv6t. Each convolutional block may comprise one or more convolutional layers. The convolutional layer Conv4t takes as input a feature map Conv3h and output a feature map; the convolutional layer Conv5t takes as input a feature map Conv4h and output a feature map; and the convolutional layer Conv6t takes as input a feature map Conv5h and output a feature map. The spatial resolution of the convolutional blocks Conv4t, Conv5t and Conv6t may be the same and high, e.g., the same as that of the convolutional block Conv3b of the below branch.

In the example shown, the feature map Conv3h may be generated by combining the feature map outputted by the convolutional block Conv3b and an up-sampled feature map outputted by the subsequent convolutional block Conv4b of the below branch; the feature map Conv4h may be generated by combining the feature map outputted by the convolutional block Conv4t and an up-sampled feature map outputted by the further subsequent convolutional block Conv5b of the below branch; and the feature map Conv5h may be generated by combining the feature map outputted by the convolutional block Conv5t and an up-sampled feature map outputted by the yet further subsequent convolutional block Conv6b of the below branch. In this way, the final feature map outputted by the convolutional block Conv6t incorporates the multiple layers of the below branch with different spatial resolution and semantic information, thus it will have a high-semantic information and a high-resolution spatial structure.

In some exemplary embodiments, a respective up-sampling layer (not shown in the figure) may be used to up-sample the feature map outputted by the subsequent convolutional block Conv4b of the below branch, the feature map outputted by the further subsequent convolutional block Conv5b of the below branch, or the feature map outputted by the yet further subsequent convolutional block Conv6b of the below branch. The up-sampling layer may utilize various up-sampling methods in the art to perform up-sampling of the feature map, such as an interpolation method (e.g., a bi-linear interpolation method) or a deconvolution method. After the up-sampling, the up-sampled feature map will have the same spatial resolution as the feature map to be combined with.

In some exemplary embodiments, a respective combining layer (not shown in the figure) may be used to combine the feature map outputted by the convolutional block Conv3b and the up-sampled feature map outputted by the subsequent convolutional block Conv4b of the below branch, to combine the feature map outputted by the convolutional block Conv4t and the up-sampled feature map outputted by the further subsequent convolutional block Conv5b of the below branch, or to combine the feature map outputted by the convolutional block Conv5t and the up-sampled feature map outputted by the yet further subsequent convolutional block Conv6b of the below branch.

The combining layer may use various methods to combine the two feature maps. In some exemplary embodiments, in the case that the two feature maps have the same depth, the combining layer may combine the two feature maps simply by adding the values of each pair of corresponding elements of the two feature maps, and in the case that the two feature maps have different depths, first an additional convolutional layer (not shown in the figure) may be used to change the depth of one of the two feature maps to be the same as the depth of the other of the two feature maps, and then the combining layer may combine the two feature maps by adding the values of each pair of corresponding elements of the two feature maps. In such exemplary embodiments an additional convolutional layer (not shown in the figure) may optionally be used to reduce or increase the depth of the combined feature map.

In some other exemplary embodiments, the combining layer may combine the two feature maps by concatenating the values of each pair of corresponding elements of the two feature maps, thus forming a combined feature map with a depth equal to the sum of the depths of the two feature maps. In such exemplary embodiments, an additional convolutional layer (not shown in the figure) may optionally be used to reduce or increase the depth of the combined feature map.

According to the embodiments of the present disclosure, instead of combining the feature maps of all different convolutional layers of the below branch together directly, the proposed CNN-based network combines the feature maps of different convolutional layers gradually. In the process of each combination, the feature maps of two convolutional layers with similar semantic characteristic are combined together, and then a convolutional block follows the combined feature map of the convolutional layers to improve the semantic level and enlarge the receptive field. The proposed solution has the following advantages:

(a) The proposed solution has a final high-resolution feature map outputted by the final convolutional block. Thus, it can retain the spatial information for small-scale object detection.

(b) The proposed solution combines the feature maps of different convolutional layers gradually (i.e., combining the feature maps of convolutional layers with similar semantic levels). Thus, it can reduce the semantic gap between different convolutional layers when combining the feature maps of different convolutional layers together.

(c) The sematic level of the proposed solution is much higher. Thus, the proposed solution is more robust.

In some exemplary embodiments, the final feature map generated by the proposed CNN-based network may be further processed with a region proposal network to generate region proposals. The region proposal network may be one known in the art, such as one described in *J. Sun et al, Faster R-CNN: Towards Real-Time Object Detection with Region Proposal Networks, IEEE Trans. Pattern Analysis and Machine Intelligence*, vol. 39, no. 6, pp. 1137-1149, 2017), which is incorporated herein in its entirety as reference. For example, to generate region proposals, that is, a set of rectangular object proposals, each with an objectness score, the region proposal network may slide a small network over the generated final feature map, to generate a lower-dimensional feature, which is fed into two sibling fully connected convolutional layers, a box-regression layer for locating proposed rectangular regions and a box-classification layer for estimating the probability of objectness of each proposed rectangular region, thus generating the region proposals. Alternatively, the region proposal network may also be one to be developed in the future.

In some exemplary embodiments, the generated region proposals may be outputted as the final detected objects or recognized patterns.

In some other exemplary embodiments, both the region proposals generated by the region proposal network and the final feature map generated by the proposed CNN-based network may be further fed into a region-based object detection network (not shown in the figure), which may utilize the region proposals and the final feature map to detect objects or patterns in the input image. This region-based object detection network may be one known in the art, such as one described in *J. Sun et al, Faster R-CNN: Towards Real-Time Object Detection with Region Proposal Networks, IEEE Trans. Pattern Analysis and Machine Intelligence*, vol. 39, no. 6, pp. 1137-1149, 2017), and R. Girshick, "Fast R-CNN," in IEEE International Conference on Computer Vision (ICCV), 2015, which are incorporated herein in their entirety as reference. For example, the region-based object detection network may be a fast R-CNN detector comprising: a ROI (regions of interest) pooling layer that, for each region proposal, extracts a fixed-length feature vector from the feature map, a sequence of fully connected layers that receive and process the feature vector, and two sibling output layers including a softmax layer that produces softmax probability estimates over K+1 categories and a bonding box regression layer that produces category-specific bounding-box regression offsets, with the loss function being the joint of classification and bounding box regression. Alternatively, the region-based object detection network may also be one to be developed in the future.

It is to be appreciated that, while an architecture of a CNN-based network gradually combining multiple layers of a CNN according to some embodiments of the present disclosure are described above with reference to the figure, the above description and illustration are only exemplary, instead of limiting the present disclosure to the specific architecture as described and illustrated. For example, while the architecture are illustrated in the figure as comprising four convolutional blocks in the below branch, in other embodiments, the architecture may comprise less or more convolutional blocks. For example, in some embodiments, the architecture may comprise three convolutional blocks in the below branch, that is, Conv3b, Conv4b and Conv5b, without Conv6b, in which case, the top branch may only comprise the convolutional blocks Conv4t and Conv5t, without the convolutional block Conv6t, and the feature map outputted by the convolutional block Conv5t may be the final feature map. For further example, in some other embodiments, the architecture may comprise five, six or even more convolutional blocks in the below branch, and may correspondingly comprise four, five or even more convolutional blocks in the top branch.

Figure 2:
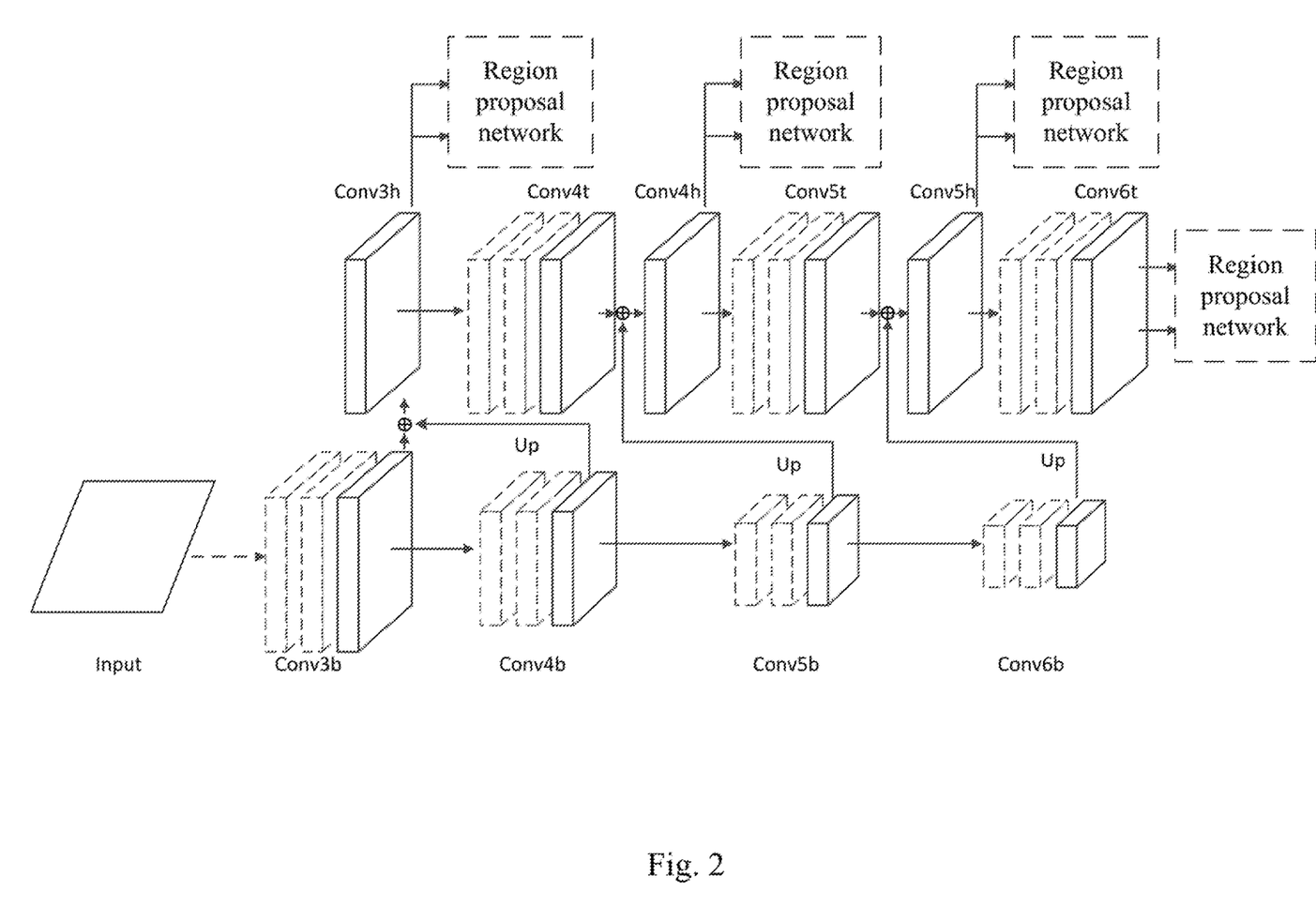
FIG. 2 shows a schematic architecture of a CNN-based network gradually combining multiple layers of a CNN according to some other embodiments of the present disclosure.

Referring to FIG. 2, there is shown a schematic architecture of a CNN-based network gradually combining multiple layers of a CNN according to some other embodiments of the present disclosure. The architecture shown in FIG. 2 is the same as the architecture shown in FIG. 1 and described above for the most part, the only difference being that in the architecture shown in FIG. 2, one or more of the intermediate feature maps formed by the combinations are also utilized by respective region proposal networks to generate respective region proposals, and a merging module (not shown in FIG. 2) is used to merge the respective region proposals to generate final region proposals, which are to be fed together with the final feature map generated by the architecture into a region-based detection network (not shown in FIG. 2) to detect objects or patterns in the input image as described above.

In some exemplary embodiments, the merging unit may use a NMS (non-maximum suppression) method to merge highly-overlapped respective region proposals to generate final region proposals.

As may be appreciated by those skilled in the art, a method for pattern recognition or object detection based on the proposed CNN-based network consists of a training stage and a test stage. The goal of the training stage is to learn the parameters of the CNN-based network. With the learned CNN-based network, the test stage is to detect objects or patterns in the test image or data.

Firstly, taking detecting objects in an image as an example, the specific training stage may be described as follows:

Step 1: Prepare a set of training images and their corresponding object ground-truths.

Step 2: Initialize the weights of each convolutional layer with Gaussian function; set up the parameters of the training stage (e.g., the learning rate, the number of iterations, the size of batch, and the ratio of positives and negatives).

Step 3: Based on the standard back-propagation algorithm, the CNN-based network is trained.

Secondly, how to use the trained CNN-based network in the test stage may be described as follows:

Step 1: Prepare a test image.

Step 2: Extract the object proposals by the trained CNN-based network.

Step 3: For each object proposal, it is sent to the region-based object detection network (e.g., Fast R-CNN detector) for classification, thus the objects in the image are detected. The object detection results (i.e., detection scores and the bounding box locations) are finally output.

Step 4: Optionally, based on the object detection results, the NMS method may be used to combine the highly-overlapped objects.

Figure 3:
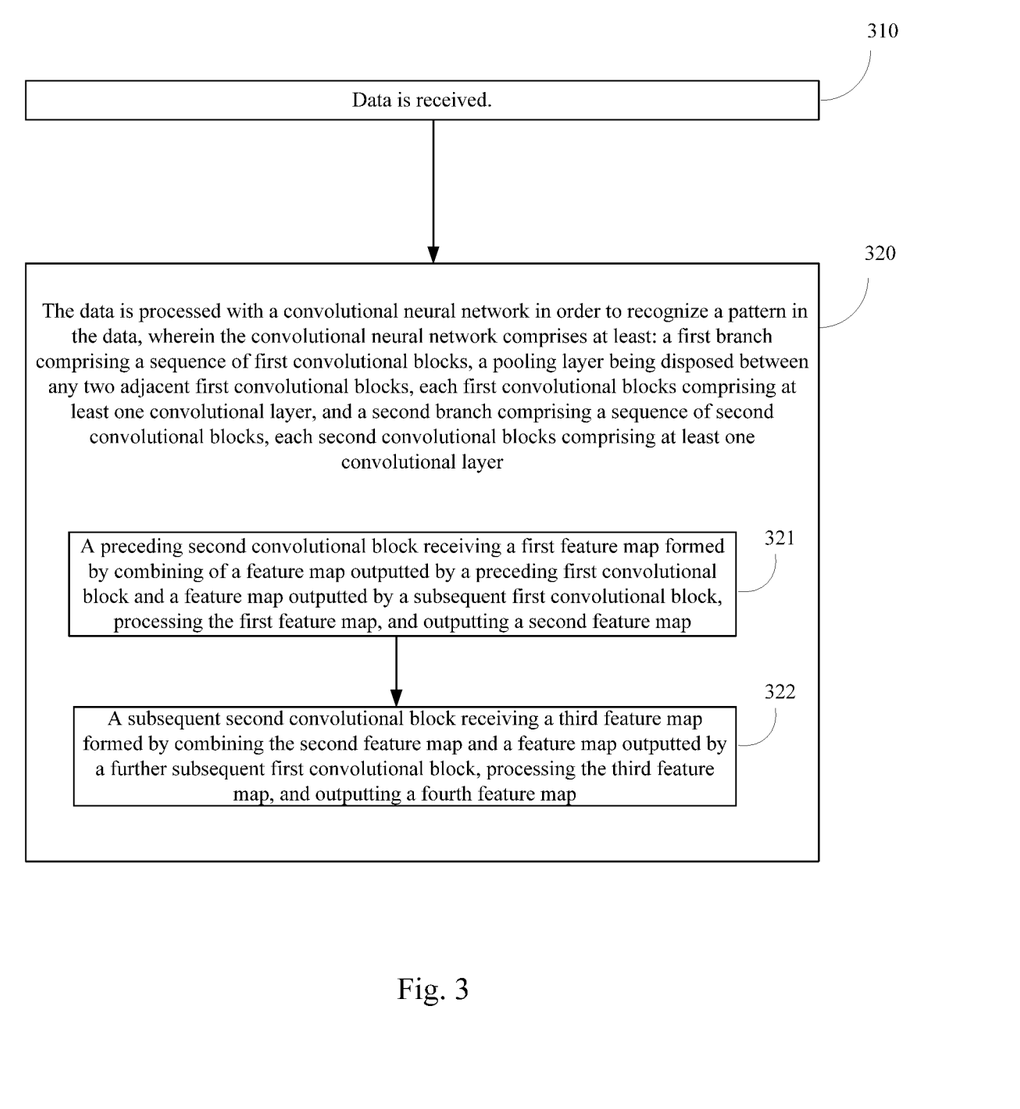
FIG. 3 shows a schematic flowchart of a method for pattern recognition according to some embodiments of the present disclosure.

Referring to FIG. 3, there is shown a schematic flowchart of a method for pattern recognition according to some embodiments of the present disclosure. As shown, the method comprises the following steps:

In step 310, data is received. The data may be any data on which pattern recognition is to be performed. For example, the data may be image data or video data on which object detection may be performed in order to find or classify objects in the image or video. Such image data may be captured by a camera in real time or otherwise obtained, such as from a storage or a network such as the Internet. For another example, the data may be audio data on which voice pattern detection may be performed for speech recognition. Such audio data may be captured by a microphone in real time or otherwise obtained, such as from a storage or a network such as the Internet.

In step 320, the data is processed with a convolutional neural network in order to recognize a pattern in the data, wherein the convolutional neural network comprises at least: a first branch comprising a sequence of first convolutional blocks, a pooling layer being disposed between any two adjacent first convolutional blocks, each first convolutional blocks comprising at least one convolutional layer, and a second branch comprising a sequence of second convolutional blocks, each second convolutional blocks comprising at least one convolutional layer, and wherein processing the data with a convolutional neural network in order to recognize a pattern in the data comprises the following sub-steps:

In sub-step 321, a preceding second convolutional block receiving a first feature map formed by combining of a feature map outputted by a preceding first convolutional block and a feature map outputted by a subsequent first convolutional block, processing the first feature map, and outputting a second feature map, and In sub-step 322, a subsequent second convolutional block receiving a third feature map formed by combining the second feature map and a feature map outputted by a further subsequent first convolutional block, processing the third feature map, and outputting a fourth feature map. It may be appreciated that the convolutional neural network may be the CNN-based network as illustrated in FIG. 1 or FIG. 2 and described above, or a variant thereof.

In some exemplary embodiments, processing the data with a convolutional neural network in order to recognize a pattern in the data further comprises the following sub-step:

a further subsequent second convolutional block receiving a fifth feature map formed by combining the fourth feature map and a feature map outputted by a yet further subsequent first convolutional block, process the fifth feature map, and outputs a sixth feature map.

In some exemplary embodiments, processing the data with a convolutional neural network in order to recognize a pattern in the data further comprises the following sub-step:

processing the sixth feature map with a region proposal network to generate final region proposals.

In some exemplary embodiments, processing the data with a convolutional neural network in order to recognize a pattern in the data further comprises the following sub-step:

processing at least two of the first feature map, the third feature map, the fifth feature map and the sixth feature map with respective region proposal networks to generate at least two of first region proposals, third region proposals, fifth region proposals, and sixth region proposals respectively; and merging the at least two of first region proposals, third region proposals, fifth region proposals, and sixth region proposals to generate final region proposals.

In some exemplary embodiments, processing the data with a convolutional neural network in order to recognize a pattern in the data further comprises the following sub-step:

utilizing the sixth feature map and the final region proposals with a region-based object detection network to classify regions as recognized patterns.

In some exemplary embodiments, forming the first feature map by combining of a feature map outputted by a preceding first convolutional block and a feature map outputted by a subsequent first convolutional block comprises:

up-sampling the feature map outputted by the subsequent first convolutional block to have the same spatial resolution as the feature map outputted by the preceding first convolutional block; and combining the up-sampled feature map outputted by the subsequent first convolutional block and the feature map outputted by the preceding first convolutional block by adding values of each pair of corresponding elements of the two feature maps, or by concatenating values of each pair of corresponding elements of the two feature maps, so as to form the first feature map;

and forming the third feature map by combining the second feature map and a feature map outputted by a further subsequent first convolutional block comprises:

up-sampling the feature map outputted by the further subsequent first convolutional block to have the same spatial resolution as the second feature map; and combining the up-sampled feature map outputted by the further subsequent first convolutional block and the second feature map block by adding values of each pair of corresponding elements of the two feature maps, or by concatenating values of each pair of corresponding elements of the two feature maps, so as to form the third feature map.

In some exemplary embodiments, the second convolutional blocks have the same spatial resolution.

In some exemplary embodiments, the preceding first convolutional block and the subsequent first convolutional block are adjacent first convolutional blocks in that there is no other first convolutional block disposed therebetween, and the subsequent first convolutional block and the further subsequent first convolutional block are adjacent first convolutional blocks in that there is no other first convolutional block disposed therebetween While a flowchart of a method for pattern recognition according to some embodiments of the present disclosure has been described with reference to FIG. 3, it will be noted that the above description and figure are only exemplary illustration, rather than limitation to the present disclosure. In other embodiments of the present disclosure, the method may include more, less or different steps than those described and illustrated, and the relationships of order, inclusion, function etc. among those steps may be different from those described and illustrated.

It will be further understood that each block of the flowchart, and combinations of blocks in the flowcharts may be implemented by various means, such as hardware, firmware, processor, circuitry, and/or other devices associated with execution of software including one or more computer program instructions. For example, one or more of the steps of the method above may be embodied by computer program instructions. In this regard, the computer program instructions which embody the steps described above may be stored by a memory device of an apparatus according to an example embodiment of the present disclosure as described hereinafter and executed by a processor of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In an example embodiment, certain ones of the operations above may be modified or further amplified. Furthermore, in an example embodiment, additional optional operations may be included. Modifications, additions, or amplifications to the operations above may be performed in any order and in any combination.

Figure 4:
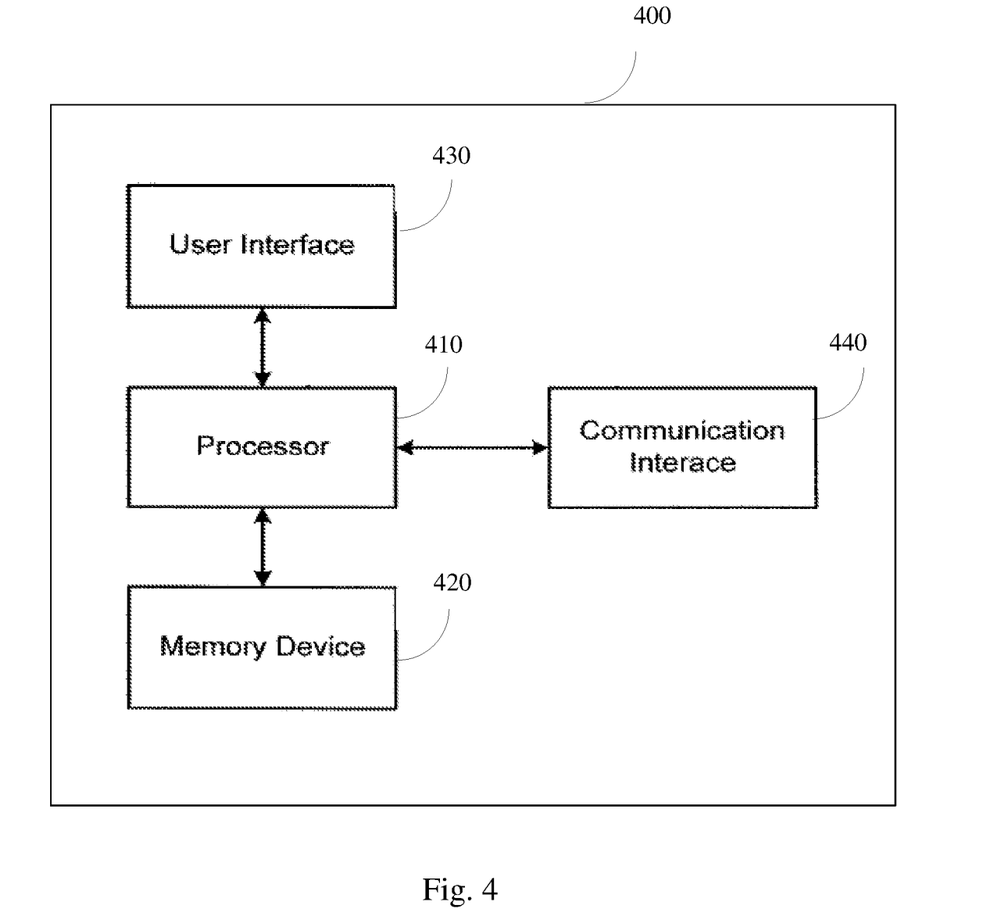
FIG. 4 shows a schematic diagram of an apparatus for pattern recognition according to some embodiments of the present disclosure.

Referring to FIG. 4, there is shown a schematic diagram of an apparatus 400 for pattern recognition according to an example embodiment of the present disclosure. The apparatus 400 may comprise at least one processor 410, at least one memory 420 including computer program code; the at least one memory 420 and the computer program code configured to, with the at least one processor 410, cause the apparatus 400 to: receive data; process the data with a convolutional neural network in order to recognize a pattern in the data, wherein the convolutional neural network comprises at least: a first branch comprising a sequence of first convolutional blocks, a pooling layer being disposed between any two adjacent first convolutional blocks, each first convolutional block comprising at least one convolutional layer, and a second branch comprising a sequence of second convolutional blocks, each second convolutional block comprising at least one convolutional layer, and wherein processing the data with a convolutional neural network in order to recognize a pattern in the data comprises: a preceding second convolutional block receiving a first feature map formed by combining of a feature map outputted by a preceding first convolutional block and a feature map outputted by a subsequent first convolutional block, processing the first feature map, and outputting a second feature map, and a subsequent second convolutional block receiving a third feature map formed by combining the second feature map and a feature map outputted by a further subsequent first convolutional block, processing the third feature map, and outputting a fourth feature map. It may be appreciated that the convolutional neural network may be the CNN-based network as illustrated in FIG. 1 or FIG. 2 and described above, or a variant thereof.

In some exemplary embodiments, the apparatus may further comprise an optional user interface 430 and/or an optional communication interface 440 for receiving the data.

In some exemplary embodiments, processing the data with a convolutional neural network in order to recognize a pattern in the data further comprises: a further subsequent second convolutional block receiving a fifth feature map formed by combining the fourth feature map and a feature map outputted by a yet further subsequent first convolutional block, processing the fifth feature map, and outputting a sixth feature map.

In some exemplary embodiments, processing the data with a convolutional neural network in order to recognize a pattern in the data further comprises: processing the sixth feature map with a region proposal network to generate final region proposals.

In some exemplary embodiments, processing the data with a convolutional neural network in order to recognize a pattern in the data further comprises:

processing at least two of the first feature map, the third feature map, the fifth feature map and the sixth feature map with respective region proposal networks to generate at least two of first region proposals, third region proposals, fifth region proposals, and sixth region proposals respectively; and merging the at least two of first region proposals, third region proposals, fifth region proposals, and sixth region proposals to generate final region proposals.

In some exemplary embodiments, processing the data with a convolutional neural network in order to recognize a pattern in the data further comprises: utilizing the sixth feature map and the final region proposals with a region-based object detection network to classify regions as recognized patterns.

In some exemplary embodiments, forming the first feature map by combining of a feature map outputted by a preceding first convolutional block and a feature map outputted by a subsequent first convolutional block comprises:

up-sampling the feature map outputted by the subsequent first convolutional block to have the same spatial resolution as the feature map outputted by the preceding first convolutional block; and combining the up-sampled feature map outputted by the subsequent first convolutional block and the feature map outputted by the preceding first convolutional block by adding values of each pair of corresponding elements of the two feature maps, or by concatenating values of each pair of corresponding elements of the two feature maps, so as to form the first feature map;

and forming the third feature map by combining the second feature map and a feature map outputted by a further subsequent first convolutional block comprises:

up-sampling the feature map outputted by the further subsequent first convolutional block to have the same spatial resolution as the second feature map; and combining the up-sampled feature map outputted by the further subsequent first convolutional block and the second feature map block by adding values of each pair of corresponding elements of the two feature maps, or by concatenating values of each pair of corresponding elements of the two feature maps, so as to form the third feature map.

In some exemplary embodiments, the second convolutional blocks have the same spatial resolution.

In some exemplary embodiments, the preceding first convolutional block and the subsequent first convolutional block are adjacent first convolutional blocks in that there is no other first convolutional block disposed therebetween, and the subsequent first convolutional block and the further subsequent first convolutional block are adjacent first convolutional blocks in that there is no other first convolutional block disposed therebetween.

In some exemplary embodiments, the processor 410 (and/or co-processors or any other processing circuitry assisting or otherwise associated with the processor 410) may be in communication with the memory 420 via a bus for passing information among components of the apparatus 400. The memory 420 may include, for example, one or more volatile and/or non-volatile memories. In other words, for example, the memory 420 may be an electronic storage device (for example, a computer readable storage medium) comprising gates configured to store data (for example, bits) that may be retrievable by a machine (for example, a computing device like the processor 410). The memory 420 may be configured to store information, data, applications, instructions, or the like for enabling the apparatus 400 to carry out various functions in accordance with an example embodiment of the present disclosure. For example, the memory 420 could be configured to buffer input data for processing by the processor 410. Additionally or alternatively, the memory device 420 could be configured to store instructions for execution by the processor 410.

The apparatus 400 may be embodied as a chip or chip set. In other words, the apparatus 400 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus 400 may therefore, in some cases, be configured to implement an example embodiment of the present disclosure on a single chip or as a single "system on a chip." As such, in some cases, a chip or chipset may constitute means for performing one or more operations for providing the functionalities described herein.

The processor 410 may be embodied in a number of different ways. For example, the processor 210 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in an example embodiment, the processor 410 may include one or more processing cores configured to perform independently. A multi-core processor may enable multiprocessing within a single physical package. Additionally or alternatively, the processor 410 may include one or more processors configured in tandem via the bus to enable independent execution of instructions, pipelining and/or multithreading.

In an example embodiment, the processor 410 may be configured to execute instructions stored in the memory 420 or otherwise accessible to the processor 410. Alternatively or additionally, the processor 410 may be configured to execute hard coded functionality. As such, whether configured by hardware or software methods, or by a combination thereof, the processor 410 may represent an entity (for example, physically embodied in circuitry) capable of performing operations according to an example embodiment of the present disclosure while configured accordingly. Thus, for example, when the processor 410 is embodied as an ASIC, FPGA or the like, the processor 410 may be specifically configured hardware for conducting the operations described herein. Alternatively, as another example, when the processor 410 is embodied as an executor of software instructions, the instructions may specifically configure the processor 410 to perform the algorithms and/or operations described herein when the instructions are executed. However, in some cases, the processor 410 may be a processor of a specific device (for example, a mobile terminal or network entity) configured to employ an example embodiment of the present disclosure by further configuration of the processor 410 by instructions for performing the algorithms and/or operations described herein. The processor 410 may include, among other things, a clock, an arithmetic logic unit (ALU) and logic gates configured to support operation of the processor 410.

Meanwhile, the optional communication interface 440 may be any means such as a device or circuitry embodied in either hardware or a combination of hardware and software that is configured to receive and/or transmit data from/to a network and/or any other device or module in communication with the apparatus 400. In this regard, the communication interface 440 may include, for example, an antenna (or multiple antennas) and supporting hardware and/or software for enabling communications with a wireless communication network. Additionally or alternatively, the communication interface 440 may include the circuitry for interacting with the antenna(s) to cause transmission of signals via the antenna(s) or to handle receipt of signals received via the antenna(s). In some environments, the communication interface 240 may alternatively or also support wired communication. As such, for example, the communication interface 440 may include a network interface card, a communication modem and/or other hardware/software for supporting communication via optical fiber, cable, digital subscriber line (DSL), universal serial bus (USB) or other mechanisms.

In an example embodiment, the apparatus 400 may include a user interface 430 that may, in turn, be in communication with the processor 410 to receive an indication of, or relating to, a user input and/or to cause provision of an audible, visual, mechanical or other output to the user. As such, the user interface 430 may include, for example, a keyboard, a mouse, a joystick, a display, a touch screen(s), touch areas, soft keys, a microphone, a speaker, or other input/output mechanisms.

While an apparatus for pattern recognition according to some embodiments of the present disclosure has been described with reference to FIG. 4, it will be noted that the above description and figure are only exemplary illustration, rather than limitation to the present disclosure. In other embodiments of the present disclosure, the apparatus may include more, less or different components than those described and illustrated, and the relationships of connection, inclusion, function etc. among those components may be different from those described and illustrated.

Figure 5:
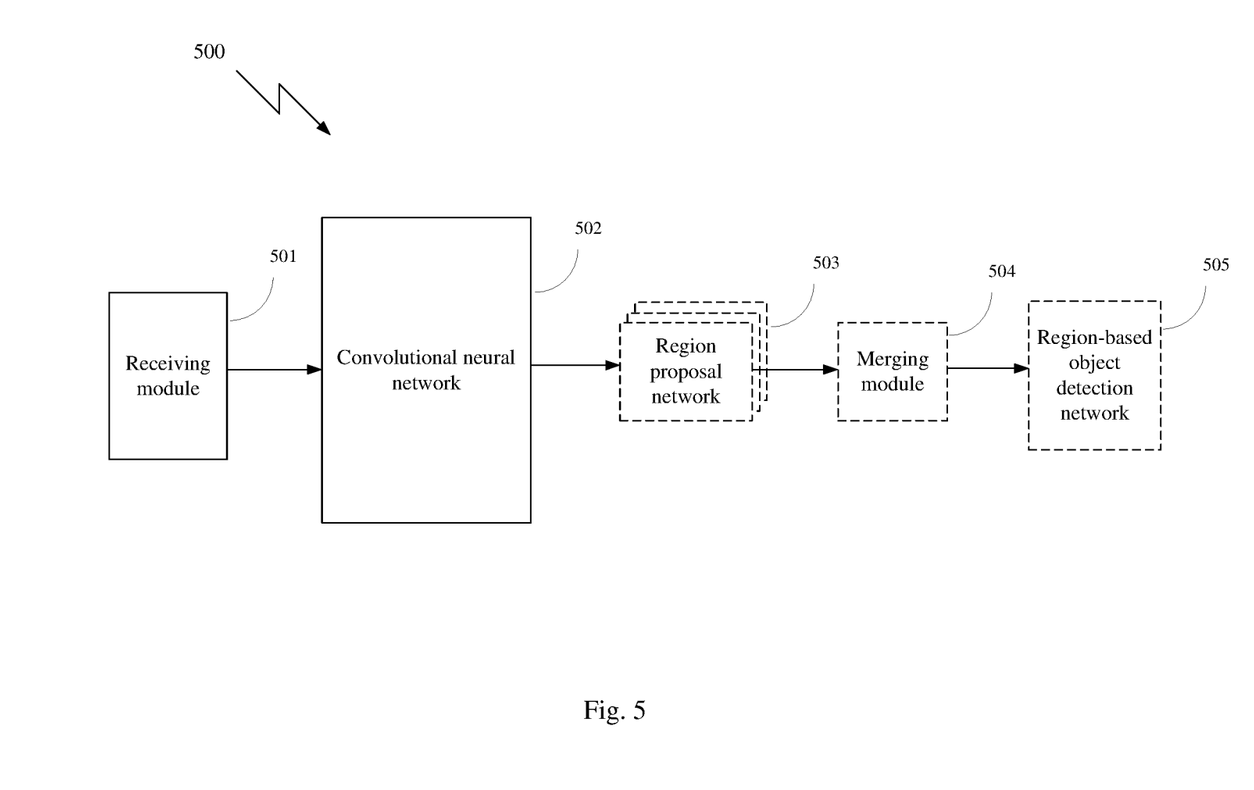
FIG. 5 shows a schematic diagram of a system for pattern recognition according to some embodiments of the present disclosure.

Referring to FIG. 5, there is shown a system 500 for pattern recognition according to some embodiments of the present disclosure. As shown, the system 500 comprises: a receiving module 501 configured to receive data; and a convolutional neural network 502 configured to process the data in order to recognize a pattern in the data, wherein the convolutional neural network comprises at least: a first branch comprising a sequence of first convolutional blocks, a pooling layer being disposed between any two adjacent first convolutional blocks, each first convolutional block comprising at least one convolutional layer, and a second branch comprising a sequence of second convolutional blocks, each second convolutional block comprising at least one convolutional layer, wherein processing the data in order to recognize a pattern in the data comprises:

a preceding second convolutional block receiving a first feature map formed by combining of a feature map outputted by a preceding first convolutional block and a feature map outputted by a subsequent first convolutional block, processing the first feature map, and outputting a second feature map, and a subsequent second convolutional block receiving a third feature map formed by combining the second feature map and a feature map outputted by a further subsequent first convolutional block, processing the third feature map, and outputting a fourth feature map. It may be appreciated that the convolutional neural network may be the CNN-based network as illustrated in FIG. 1 or FIG. 2 and described above, or a variant thereof.

In some exemplary embodiments, processing the data in order to recognize a pattern in the data further comprises: a further subsequent second convolutional block receiving a fifth feature map formed by combining the fourth feature map and a feature map outputted by a yet further subsequent first convolutional block, processing the fifth feature map, and outputting a sixth feature map.

In some exemplary embodiments, the system 500 further optionally comprises: a region proposal network 503 configured to process the sixth feature map to generate final region proposals.

In some other exemplary embodiments, the system 500 further optionally comprises:

respective region proposal networks 503 configured to processing at least two of the first feature map, the third feature map, the fifth feature map and the sixth feature map to generate at least two of first region proposals, third region proposals, fifth region proposals, and sixth region proposals respectively; and a merging module 504 configured to merge the at least two of first region proposals, third region proposals, fifth region proposals, and sixth region proposals to generate final regions proposals.

In some exemplary embodiments, the system 500 further optionally comprises: a region-based object detection network 505 configured to utilize the sixth feature map and the final region proposals to classify regions as recognized patterns.

In some exemplary embodiments, the convolutional neural network 502 further comprises:

a first up-sampling layer configured to up-sample the feature map outputted by the subsequent first convolutional block to have the same spatial resolution as the feature map outputted by the preceding first convolutional block;

a first combining layer configured to combine the up-sampled feature map outputted by the subsequent first convolutional block and the feature map outputted by the preceding first convolutional block by adding values of each pair of corresponding elements of the two feature maps, or by concatenating values of each pair of corresponding elements of the two feature maps, so as to form the first feature map;

a second up-sampling layer configured to up-sample the feature map outputted by the further subsequent first convolutional block to have the same spatial resolution as the second feature map; and a second combining layer configured to combine the up-sampled feature map outputted by the further subsequent first convolutional block and the second feature map block by adding values of each pair of corresponding elements of the two feature maps, or by concatenating values of each pair of corresponding elements of the two feature maps, so as to form the third feature map.

In some exemplary embodiments, the second convolutional blocks have the same spatial resolution.

In some exemplary embodiments, the preceding first convolutional block and the subsequent first convolutional block are adjacent first convolutional blocks in that there is no other first convolutional block disposed therebetween, and the subsequent first convolutional block and the further subsequent first convolutional block are adjacent first convolutional blocks in that there is no other first convolutional block disposed therebetween.

The system may be embodied in software, firmware, hardware or a combination thereof. For example, the system may be embodied in one or more computer programs which may be stored in a storage medium or a memory device and may be loaded and executed by a processing device so as to perform the functions of the system. As another example, the system may be embodied in a computing device configured by one or more computer programs to perform the functions of the system.

In another embodiment of the present disclosure, there is provided a computer readable medium encoded with instructions that, when executed by a computer, cause performance of a method for pattern recognition according to any one embodiment of the present disclosure as described above.

The convolutional neural network according to embodiments of the present disclosure may be embodied in software, firmware, hardware or a combination thereof. For example, the convolutional neural network may be embodied in one or more computer programs which may be stored in a storage medium or a memory device and may be loaded and executed by a processing device. For another example, the convolutional neural network may be embodied in a computing device configured by one or more computer programs.

The inventive solution can generate high-level semantic and high-resolution feature maps. With high-level semantic information, the feature representation ability is much stronger and the feature is more robust. With high-resolution feature maps, more spatial information for detection of small-scale objects can be retained.

KITTI is a famous visual benchmark (http://www.cvlibs.net/datasets/kitti). For object detection, it has 7481 training images and 7518 test images. The VGG16 architecture (K. Simonyan and A. Zisserman, *Very Deep Convolutional Networks For Large-Scale Image Recognition [J]*, arXiv: 1409.1556, 2014) is adopted to demonstrate the effectiveness of the inventive solution.

The inventive method is compared to two other methods: (a) the original method based on original VGG16 (called method A); (2) the method of combining multiple layers directly (called method B). For pedestrian detection, the average precision (AP) of method A on moderate subset is 64.33%, the average precision (AP) of method B on moderate subset is 65.78%, while that of the inventive method on moderate subset is 68.47%. For cyclist detection, the average precision (AP) of method A on moderate subset is 62.21%, the average precision (AP) of method B on moderate subset is 63.42%, while that of the inventive method on moderate subset is 66.29%. Thus, the inventive method can improve detection performance considerably.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Many modifications and other embodiments of the present disclosure set forth herein will come to mind to one skilled in the art to which the inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method for pattern recognition, comprising:
   processing data with a convolutional neural network in order to recognize a pattern in the data, wherein the convolutional neural network comprises at least:
      a first branch comprising a sequence of first convolutional blocks, a pooling layer being disposed between any two adjacent first convolutional blocks, each first convolutional blocks comprising at least one convolutional layer, and
      a second branch comprising a sequence of second convolutional blocks, each second convolutional blocks comprising at least one convolutional layer, and
   wherein the processing the data with the convolutional neural network further comprises:
      a preceding second convolutional block receiving a first feature map formed by combining of a feature map outputted by a preceding first convolutional block and a feature map outputted by a subsequent first convolutional block, processing the first feature map, and outputting a second feature map, and
      a subsequent second convolutional block receiving a third feature map formed by combining the second feature map and a feature map outputted by a further subsequent first convolutional block, processing the third feature map, and outputting a fourth feature map; and
      generating region proposals utilizing at east one of the second feature map and the fourth feature map;

merging the region proposals to generate final region proposals; and feeding the final region proposals with a final feature map into a region-based detection network to detect patterns.

2. The method of claim 1, wherein processing the data with the convolutional neural network in order to recognize the pattern in the data further comprises:

a further subsequent second convolutional block receiving a fifth feature map formed by combining the fourth feature map and a feature map outputted by a yet further subsequent first convolutional block, process the fifth feature map, and outputs a sixth feature map.

3. The method of claim 2, wherein processing the data with the convolutional neural network in order to recognize the pattern in the data further comprises:

processing the sixth feature map with a region proposal network to generate final region proposals.

4. The method of claim 2, wherein processing the data with the convolutional neural network in order to recognize the pattern in the data further comprises:

processing at least two of the first feature map, the third feature map, the fifth feature map and the sixth feature map with respective region proposal networks to generate at least two of first region proposals, third region proposals, fifth region proposals, and sixth region proposals respectively; and merging the at least two of first region proposals, third region proposals, fifth region proposals, and sixth region proposals to generate final region proposals.

5. The method of claim 3, processing the data with the convolutional neural network in order to recognize the pattern in the data further comprises:

utilizing the sixth feature map and the final region proposals with a region-based object detection network to classify regions as recognized patterns.

6. The method of claim 1, wherein forming the first feature map by combining of the feature map outputted by the preceding first convolutional block and the feature map outputted by the subsequent first convolutional block further comprises:

up-sampling the feature map outputted by the subsequent first convolutional block to have the same spatial resolution as the feature map outputted by the preceding first convolutional block; and combining the up-sampled feature map outputted by the subsequent first convolutional block and the feature map outputted by the preceding first convolutional block by adding values of each pair of corresponding elements of the two feature maps, or by concatenating values of each pair of corresponding elements of the two feature maps, so as to form the first feature map;

and wherein forming the third feature map by combining the second feature map and the feature map outputted by the further subsequent first convolutional block further comprises:

up-sampling the feature map outputted by the further subsequent first convolutional block to have the same spatial resolution as the second feature map; and combining the up-sampled feature map outputted by the further subsequent first convolutional block and the second feature map block by adding values of each pair of corresponding elements of the two feature maps, or by concatenating values of each pair of corresponding elements of the two feature maps, so as to form the third feature map.

7. The method of claim 1, wherein the second convolutional blocks have the same spatial resolution.

8. The method of claim 1, wherein the preceding first convolutional block and the subsequent first convolutional block are adjacent first convolutional blocks in that there is no other first convolutional block disposed therebetween, and the subsequent first convolutional block and the further subsequent first convolutional block are adjacent first convolutional blocks in that there is no other first convolutional block disposed therebetween.

9. An apparatus for pattern recognition, comprising:

at least one processor, at least one memory including computer program code;

the at least one memory and the computer program code configured to, with the at least one processor, cause the apparatus to:

process the data with a convolutional neural network in order to recognize a pattern in the data, wherein the convolutional neural network comprises at least:

a first branch comprising a sequence of first convolutional blocks, a pooling layer being disposed between any two adjacent first convolutional blocks, each first convolutional block comprising at least one convolutional layer, and a second branch comprising a sequence of second convolutional blocks, each second convolutional block comprising at least one convolutional layer, and wherein the processing of the data with the convolutional neural network further comprises:

a preceding second convolutional block to receive a first feature map formed by combining of a feature map outputted by a preceding first convolutional block and a feature map outputted by a subsequent first convolutional block, process the first feature map, and output a second feature map, and a subsequent second convolutional block to receive a third feature map formed by combining the second feature map and a feature map outputted by a further subsequent first convolutional block, process the third feature map, and output a fourth feature map; and generate region proposals utilizing at least one of the second feature map and the fourth feature map;

merge the region proposals to generate final region proposals; and feed the final region proposals with a final feature map into a region-based detection network to detect patterns.

10. The apparatus of claim 9, wherein the processing of the data with the convolutional neural network in order to recognize the pattern in the data further comprises:

a further subsequent second convolutional block to receive a fifth feature map formed by combining the fourth feature map and a feature map outputted by a yet further subsequent first convolutional block, process the fifth feature map, and output a sixth feature map.

11. The apparatus of claim 10, wherein the processing of the data with the convolutional neural network in order to recognize the pattern in the data further comprises:

process the sixth feature map with a region proposal network to generate final region proposals.

12. The apparatus of claim 10, wherein the processing of the data with the convolutional neural network in order to recognize the pattern in the data further comprises:
process at least two of the first feature map, the third feature map, the fifth feature map and the sixth feature map with respective region proposal networks to generate at least two of first region proposals, third region proposals, fifth region proposals, and sixth region proposals respectively; and
merge the at least two of first region proposals, third region proposals, fifth region proposals, and sixth region proposals to generate final region proposals.

13. The apparatus of claim 11, wherein the process of the data with the convolutional neural network in order to recognize the pattern in the data further comprises:
utilize the sixth feature map and the final region proposals with a region-based object detection network to classify regions as recognized patterns.

14. The apparatus of claim 9,
wherein the forming of the first feature map by combining of the feature map outputted by the preceding first convolutional block and the feature map outputted by the subsequent first convolutional block further comprises:
up-sample the feature map outputted by the subsequent first convolutional block to have the same spatial resolution as the feature map outputted by the preceding first convolutional block; and
combine the up-sampled feature map outputted by the subsequent first convolutional block and the feature map outputted by the preceding first convolutional block by adding values of each pair of corresponding elements of the two feature maps, or by concatenating values of each pair of corresponding elements of the two feature maps, so as to form the first feature map;
and wherein the forming of the third feature map by combining the second feature map and the feature map outputted by the further subsequent first convolutional block further comprises:
up-sample the feature map outputted by the further subsequent first convolutional block to have the same spatial resolution as the second feature map; and
combine the up-sampled feature map outputted by the further subsequent first convolutional block and the second feature map block by adding values of each pair of corresponding elements of the two feature maps, or by concatenating values of each pair of corresponding elements of the two feature maps, so as to form the third feature map.

15. The apparatus of claim 9, wherein the second convolutional blocks have the same spatial resolution.

16. The apparatus of claim 9, wherein the preceding first convolutional block and the subsequent first convolutional block are adjacent first convolutional blocks in that there is no other first convolutional block disposed therebetween, and the subsequent first convolutional block and the further subsequent first convolutional block are adjacent first convolutional blocks in that there is no other first convolutional block disposed therebetween.

17. A non-transitory computer readable medium comprising program instructions stored thereon for performing at least the following:
processing data with a convolutional neural network in order to recognize a pattern in the data, wherein the convolutional neural network comprises at least:
a first branch comprising a sequence of first convolutional blocks, a pooling layer being disposed between any two adjacent first convolutional blocks, each first convolutional block comprising at least one convolutional layer, and
a second branch comprising a sequence of second convolutional blocks, each second convolutional block comprising at least one convolutional layer,
wherein the processing of the data in order to recognize the pattern in the data further comprises:
a preceding second convolutional block to receive a first feature map formed by combining of a feature map outputted by a preceding first convolutional block and a feature map outputted by a subsequent first convolutional block, process the first feature map, and output a second feature map, and
a subsequent second convolutional block to receive a third feature map formed by combining the second feature map and a feature map outputted by a further subsequent first convolutional block, process the third feature map, and output a fourth feature map; and
generating region proposals utilizing at least one of the second feature map and the fourth feature map;
merging the region proposals to generate final region proposals; and
feeding the final region proposals with a final feature map into a region-based detection network to detect patterns.

18. The system of claim 17, wherein the processing of the data in order to recognize the pattern in the data further comprises:
a further subsequent second convolutional block to receive a fifth feature map formed by combining the fourth feature map and a feature map outputted by a yet further subsequent first convolutional block, process the fifth feature map, and output a sixth feature map.

19. The system of claim 18, further comprising:
a region proposal network configured to process the sixth feature map to generate final region proposals.

20. The system of claim 18, further comprising:
respective region proposal networks configured to process at least two of the first feature map, the third feature map, the fifth feature map and the sixth feature map to generate at least two of first region proposals, third region proposals, fifth region proposals, and sixth region proposals respectively; and
a merging module configured to merge the at least two of first region proposals, third region proposals, fifth region proposals, and sixth region proposals to generate final regions proposals.

* * * * *